Patented May 9, 1944

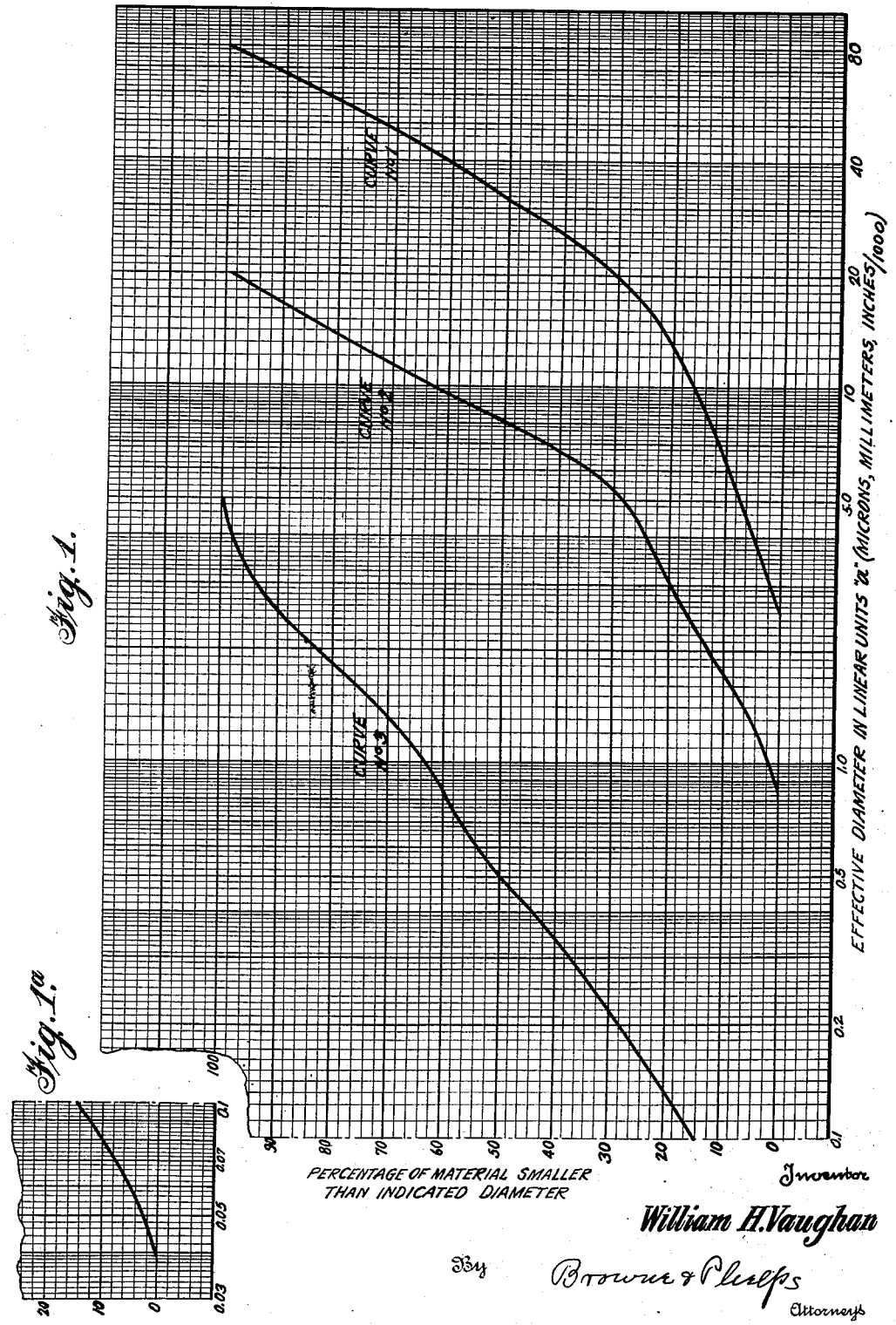

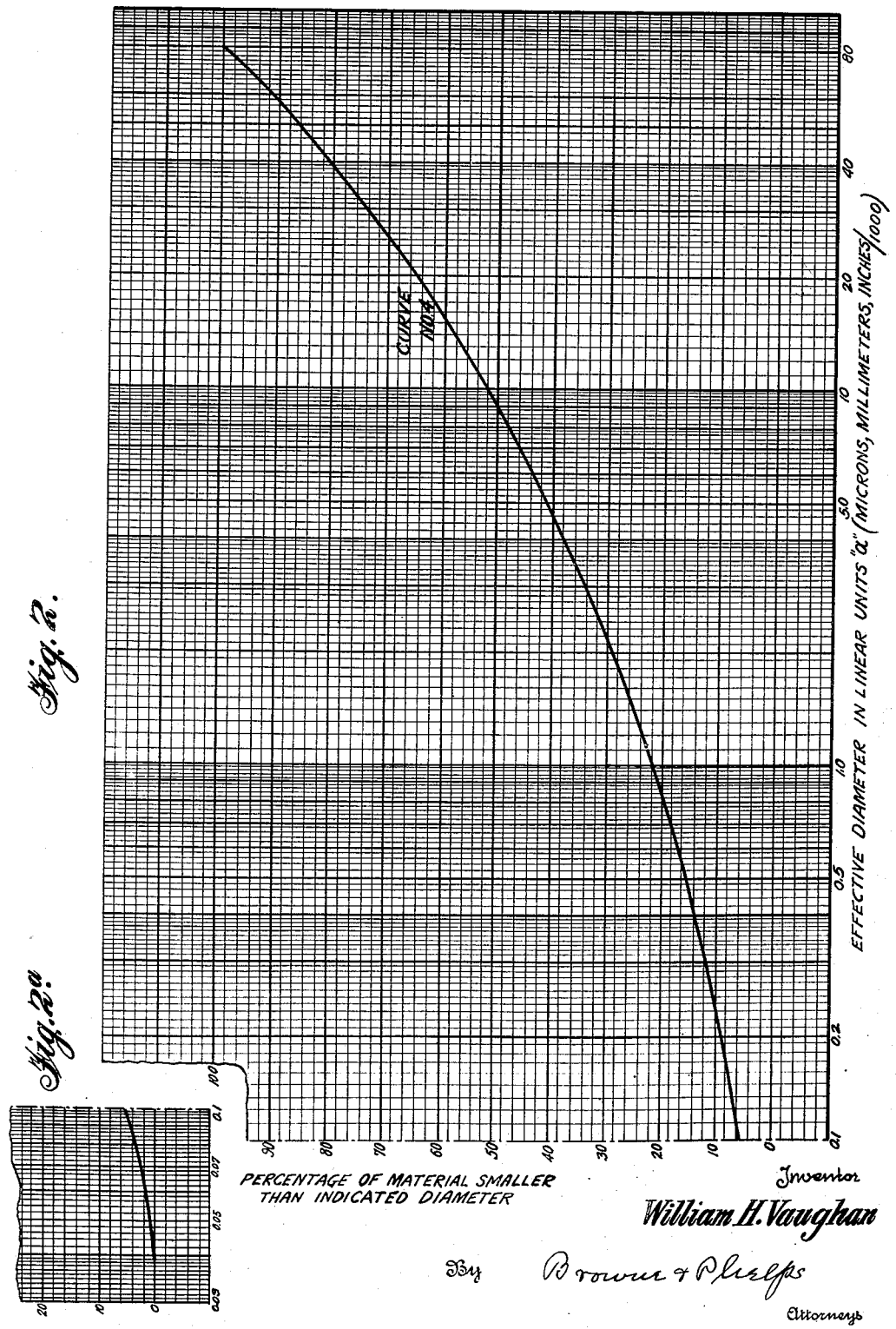

2,348,315

UNITED STATES PATENT OFFICE 2,348,315

PENCIL LEAD, CRAYON, AND CERAMIC

William Harry Vaughan, De Kalb County, Ga., assignor to M. A. Ferst, Ltd., Atlanta, Ga., a corporation of Georgia Application February 9, 1940, Serial No. 318,167

5 Claims. (Cl. 106—19)

The invention is a process for controlling particle sizes and packing in bodies processed in the plastic and dry-press conditions and hence the properties of finished articles made therefrom by physical and/or pyro-physical control thereof, thereby improving the processing qualities of the bodies and the qualities of finished articles made therefrom, and relates particularly to colored leads and crayons and black leads and to ceramically non-refractory bodies and articles made therefrom which particle sizes and packing properties are controlled.

Objectives of the invention are to provide a control of particle sizes in bodies consisting of plastic and non-plastic constituents, prior to plastic processing, whereby the plasticity of the materials may be increased with the usual amount of plasticizer; whereby the volume of the non-plastic may be increased relative to the volume of plastic without decreasing the plasticity of the body as a whole; whereby the shrinkage in both drying and firing may be decreased; whereby relative movement between the particles of the material during the working and/or drying, and/or firing processes may be decreased; whereby the density of the body before and after drying, and/or before and after firing may be increased, decreased or controlled within practical limits without necessitating a special control of the drying and/or firing processes.

Further objects of the invention are to improve the quality of ceramic bodies in the following respects: by decreasing the resistance to abrasion, corrosion, or chemical attack, where such qualities inhere in the aggregate; by decreasing the porosity or by making more uniform the size and distribution of the pores; by increasing the compressive, tensile, torsional, and shearing strengths.

It is understood that black leads generally have an inorganic bonding agent such as clays, and that crayons, or colored leads generally, have an organic bonding agent, such as gum. Moreover, according to the present manufacturing practice, there is no control by measure of the particles in the present grinding methods which will yield a controllable density or packing of particles in the total plastic masses, commonly called bodies.

It is generally understood that, in the ceramic and other industries, equipment is available for size reduction and/or separating particles in the ranges from one centimeter to 0.01 micron in effective diameter. It is distinctly understood, in this invention, that the required groups of particles of controlled sizes may or may not be physically separated, but that they must be susceptible to quantitative analyses and/or syntheses.

Natural materials generally do not occur suitably sized, but if they do so occur controlled blending is practiced or separable portions only may be used. The separation of the materials into desirably sized batches, if required, may be secured, after size reduction in any manner, by differential sedimentation, centrifugation, air flotation, electro-magnetic, electro-static, or cataphoretic separation, screening, or any other commonly known method, depending upon the nature of the material and the fineness of particles dealt with.

The name "Densitrol" is applied to the process and the resulting product because of the control of density and hence certain properties in the product of the invention attained by the process of the invention.

It is known that the tensile strength of glass fiber increases with increasing ratio between surface and cross sectional area. Thus, technologists have found that glass filaments 0.0005-inch in diameter have a tensile strength of approximately 350,000 pounds per square inch, whereas those 0.00005-inch in diameter have a tensile strength of approximately 1,500,000 pounds per square inch. This principle of increasing surface area relative to cross sectional area is applied to glassy films in the case of black leads and ceramic bodies and to organic colloidal films in the case of crayons or leads whose bonding agents are dried instead of fired.

In the drawings,

Figure 1 is a chart showing three groups of sizes of materials to be compounded in a body, two of which may be non-plastic materials, such as mixtures of sizes of graphite in block-marking products, and the third and finest material may represent the bond such as clay or clays; in the case of crayons or colored leads, the two larger sized substances may include stearates, clays, and dyes, and the finest material may be gum;

Fig. 1a is an extension to the left of Figure 1;

Fig. 2 is a chart wherein the desired mixture of the sizes of the particles derived by one phase of the present invention is plotted as a single curve; and Fig. 2a is an extension to the left of Figure 2.

Leaving aside the materials added to bodies of the kind mentioned to colloidally affect the plasticity of the bond or to chemically affect the body ingredients, such bodies consist of a non-plastic and a bond. In such finely divided and high grade bodies as pencil leads or whitewares and crayons, the non-plastic and bond are commonly blended without control of particle size or consideration of the fitting or packing of particles. In practice, either non-plastic or bond or the combination may be ground or processed essentially so as to produce particles of either the maximum or minimum size desired, and each batch will obviously contain a considerable range of particle sizes. Desirably, the bond material is reduced to particle sizes smaller than those of the non-plastic.

When the ceramic body is black pencil lead, where the non-plastic may be graphite and the bond may be clay, the processing principles of the invention are applied as in ceramics generally.

According to the present invention, the particles of the materials are so chosen as to provide a maximum packing, wherein each group of smaller-sized particles partially fill the interstices between the larger-sized particles, the bond materials partaking in this arrangement. By so doing, the non-plastic particles in the mix and in the final product are brought substantially as near together as possible, with the result that the bond exists between the non-plastic particles in very thin films.

In the drying of the organically-bonded bodies, the bond is reduced to a "horny" physical condition, and in the firing of the inorganically-bonded bodies the bond becomes essentially glassy. By reducing the amount of plastic bond required in plastic processing, particularly for extrusion, there is less likelihood of objectionable layering or laminating of the material, which introduces lines of partition or weakness in the finished body.

The choice of sizes of the aggregate may be made by either the continuous-grading or by what may be called the gap-grading methods, gap-grading being a particular case of continuous-grading. The maximum sized particles permissible in the compounding of a batch for any given product is determined by the functional uniformity requirements. Surface, continuity, and other characteristic considerations govern. The best theoretical approach is through the employment of the continuous-grading system, but practical particle size limitations may require a modification of the system, known as gap-grading. Continuous grading is a particle size system which contains minimum attainable group size steps with no missing groups intermediate between the largest and the smallest sized particles.

Example of gap grading

Certain of the advantages of the present invention may be had by gap grading in the following manner. Divide the materials or sizes of the materials to be combined into groups to the median size particles of each group related to the median size of the next larger group in the ratio 1:1.1 to 1:8 depending upon the results desired. Of these groups an amount of each is taken for compounding, the amount of each group not less than equal to nor more than one and one-half times the amount taken of the next smaller size particle group.

Example of continuous grading

In accordance with the continuous-grading principle, assuming that two batches of aggregate have been ground so that the largest particles of one batch have an effective diameter of 80 times some linear unit "$a$" (microns, millimeters, inches/1000), and of the second batch there is present a maximum size of 20 times "$a$" and that the bond material has been prepared to have a minimum size of 0.039 "$a$," the sizes of the particles in the various batches in a representative mix may be illustrated by curves 1, 2, and 3, respectively, on the chart of Figure 1, wherein the smallest size of the coarsest component material is illustrated as being substantially $2.5a$, the smallest size of the material of the intermediate-sized component as having a diameter of substantially $0.82a$, and the maximum size of the bond particles will be substantially $5a$ (Figure 1).

In the solution of the blending problem, for example, arbitrarily adopting 1 to 2 as the diametral ratio of the median-sized particles of successive theoretical groups, (beginning with the group of finest particles), the materials of curves 1, 2, and 3 fall into groups as follows:

| Group No. | Range in effective diameter | Mean diameter | Diametral ratios between groups |
|---|---|---|---|
| 1 | $0.039a$ to $0.078a$ | $0.0585a$ | 1:2 |
| 2 | $0.078a$ to $0.156a$ | $0.1170a$ | 1:2 |
| 3 | $0.156a$ to $0.312a$ | $0.234a$ | 1:2 |
| 4 | $0.312a$ to $0.625a$ | $0.468a$ | 1:2 |
| 5 | $0.625a$ to $1.250a$ | $0.937a$ | 1:2 |
| 6 | $1.250a$ to $2.500a$ | $1.875a$ | 1:2 |
| 7 | $2.500a$ to $5a$ | $3.750a$ | 1:2 |
| 8 | $5a$ to $10a$ | $7.500a$ | 1:2 |
| 9 | $10a$ to $20a$ | $15.000a$ | 1:2 |
| 10 | $20a$ to $40a$ | $30.000a$ | 1:2 |
| 11 | $40a$ to $80a$ | $60.000a$ | 1:2 |

We thus find that for continuous-grading, the materials to be used will fall into 11 theoretical groups.

To determine the volume ratios of materials in each adjacent larger group, we apply the formula $$r = \frac{1}{\sqrt[n/m]{V}} \quad (1)$$

wherein $r$ represents the ratio between the percentage to be used of any group of particles and the percentage to be used of the next larger-sized particle group; wherein $V$ equals the percentage of voids experimentally found to be present in the mix as if the particles were of relatively uniform size (i. e., the largest particles not more than 1.4 times the diameter of the smallest); wherein $n$ is a component factor derived by the Furnas theory of voids (equals $0.44 - \frac{1}{2}\log_{10} P = 2.096$, where $P$ = diametral ratio of smallest to largest particle in the system under consideration 0.0004875); and wherein $m$ is the number of theoretical groups. Where the largest particles of any group are not more than 1.4 times the size of the smallest particles of the group, as stated the voids are experimentally found to be 40% or 0.4. Substituting in the equation $V = .4$, $n$ (from Furnas theory) = 2.096 and $m = 11$ the equation becomes $r = 1$ divided by 2.096 divided by 11 (=.19) times .4 (=.76) 1 divided by .76=1.2. The Equation 1, being solved therefore, yields 1.2 as the ratio between the percentage by volume of any group and the adjacent group of next larger particles.

Having established this ratio of amounts in each successive group as 1.2, and letting X equal the percentage in the smallest sized group, it is obvious that:

$$X+1.2X+1.44X+1.73X+2.08X+2.49X+2.99X+3.59X+4.31X+5.17X+6.20X=100\%$$

whence $$32.20X=100\%$$

and $$X=3.10\%$$

Substituting this value of X for each of the 11 groups in the above equation we find the amounts by volume of the groups to be:

| | Per cent |
|---|---|
| 1 | 3.10 |
| 2 | 3.74 |
| 3 | 4.48 |
| 4 | 5.38 |
| 5 | 6.44 |
| 6 | 7.73 |
| 7 | 9.28 |
| 8 | 11.16 |
| 9 | 13.38 |
| 10 | 16.03 |
| 11 | 19.28 |

From these data we now plot curve 4.

By a series of trials it may be ascertained that:

| | Parts by volume |
|---|---|
| Material of curve No. 1 | 50 |
| Material of curve No. 2 | 20 |
| Material of curve No. 3 | 30 | would satisfy the requirements of cure No. 4.

It being known that the apparent specific gravity of material No. 1 is 2.24; of material No. 2, 2.24; and of material No. 3, 2.70, the volumetric quantities reduced to weight percentages are as follows:

| | Per cent |
|---|---|
| Material of curve No. 1 | 47.2 |
| Material of curve No. 2 | 18.8 |
| Material of curve No. 3 | 34.4 | and the volumetric distribution of the blended particle sizes in the calculated batch would agree with curve No. 4 within 1% at all points.

Where the final mix has been made as described the thus prepared material is processed in any usual manner as mixing with plasticizer forming by molding or extrusion, and drying or firing, as required for the material or article under production. A small quantity of abrasive material may be added if desired. The bond material should surely fill the smallest voids and to be certain of this it is preferable to have a slight excess of this material.

It is obvious that, under this treatment, the ratio of group median diameters of adjacent groups must be constant, but this constant can be arbitrarily set to satisfy the technical requirements arising with measurable physical variations between different substances used in any desired batch composition. In the exhibited illustration, for technical convenience, the constant group diametral ratio is taken as two is to one.

In the event that this result would not derive from the range of particles in the various materials, the fractions must be split and the groups properly blended, or the grinding should be so controlled as to produce a proper fit of the groups to the theoretical.

In the application of the invention to pencil leads, because the film of clay or other binder between the graphite and/or colored particles and/or filler particles is reduced to a minimum, a stronger pencil lead will result simultaneously with an equal blackness or intensity of color as compared with formed products, or an increased intensity of color or blackness as in writing may be had with a strength of lead equal to that heretofore resulting; simultaneously, improved smoothness and uniformity will be achieved. Moreover, any of the qualities of smoothness, uniformity, or intensity of color or blackness as in writing may be improved considerably over the presently manufactured products while achieving an equal strength.

A pencil lead breaks in use essentially by failure of the body in tension. It follows that the reduction of the thickness of glassy bond films between the graphite particles as taught by the present invention will increase the strength of the lead. A further improvement will be had by an increase in the continuity of contact between particles of the aggregate and bond enabling them to more efficiently coalesce or bond at equal or lower temperatures than heretofore. By properly sizing, blending and mixing particles in batches of body, such as taught by this invention, relative movements between particles in subsequent processes, such as forming, drying, and firing are reduced to a minimum, thereby minimizing interparticle strains and achieving maximum strength, continuity, and uniformity.

While the thinning of the glassy layers of an equal volume of bond between the particles of color (or of blackness) very greatly increases the break-under-tension strength of the pencil lead as a whole, the breaking strength of the individual glassy films is reduced under the forces of attrition, as in writing, and therefore a deeper color (or blackness) will result in use. A plainer mark will result with an equal strength and smoothness of pencil lead or an equally plain mark will result with a stronger and smoother pencil lead.

The individual voids of the body provided by the invention will be of smaller size than heretofore, and, in addition, the voids will be more uniform in size and distribution. Therefore, as applied to black pencil leads, the wax will be more uniformly distributed throughout the body by impregnation. Moreover, the wax films thus formed in the finished product will be controlled in size and shape by the interstitial voids. Since these wax films will be thinner than formerly, their strength contribution to the product will be greater for any volume present and the uniformity of deposition on paper, as in writing, will promote a more uniform deposition of color (or blackness).

The invention is applicable to the manufacture and composition of black or other colored leads and crayons, and to certain products of the ceramic industry such as dinnerware, electrical, chemical, thermal shock, and semi-porcelain, hotel china, sanitary ware, stoneware, ceramic insulators, carbon or graphite resistors, arc light or furnace "carbons" and the like.

The maximum packing principles of the invention may be applied in a reverse sense to secure maximum and uniformly separated pores in ceramic filters, heat and sound insulators and the like by selecting as non-plastic a combustible which may be volatilized in the heating process, leaving a vesicular skeletal structure of the original heat-resisting bond having minimum density.

Minor changes may be made in the steps of the process within the scope of the appended claims without departing from the spirit of the invention.

I claim:

1. In the process of producing ceramic bodies: the step of providing a mixture of ceramic materials comprising groups of particles of regulated sizes in which the diametral ratios between groups adjacent in the ascending scale of gradation of sizes of particles range between 1 is to 1.1 and 1 is to 8, the amount by volume of the material comprising each group of particle sizes being not less than equal to and not more than one and one-half times the amount of the group of next smaller size particles present whereby a reduction of porosity of the finished product is accomplished.

2. The process of producing ceramic bodies which comprises: providing a mixture of ceramic materials including bonding material, and comprising groups of particles of regulated sizes of said materials in which the diametral ratios between groups adjacent in the ascending scale of gradation of sizes of particles range between 1 is to 1.1 and 1 is to 8, the amount of material in each group chosen in accordance with the Furnas theory to provide minimum voids in the mixture; plasticizing the mixture, and shaping the bodies.

3. The process of producing a ceramic body which process comprises: reducing ceramic materials including bonding material of which the body is to be composed to desired degrees of fineness of known maximum and minimum sized particles; taking for mixture a quantity of each of the thus prepared materials which will provide groups of materials in the mixture whereof the median diameter of particles of each group shall be substantially half of that of the next larger sized particle group and which will provide a ratio between the amounts of material in successively larger particle groups satisfying the formula $$\text{ratio} = \frac{1}{\sqrt[m]{n}}$$

wherein V is the percentage of voids of the materials if the particles are of substantially uniform size, $n$ is taken as substantially 2.1 and $m$ is the number of said groups; mixing the so chosen materials; and completing the body.

4. The process of producing marking bodies, as pencil leads, which comprises: compounding groups of particles of color body material and colloidal bonding material, the diametral ratio between groups adjacent in the ascending scale of gradation of sizes of particles ranging between 1 is to 1.1 and 1 is to 8; the amount taken of each group of particle sizes being not less than equal to and not more than one and one-half times the amount taken of the next smaller size particles; and the amount of bonding material being present in amount to slightly more than fill the voids between the particles of color material whereby to provide minimum voids in the body including the bonding material thereof.

5. A non-refractory, essentially non-metallic body comprising: a fired mixture of ground and graded particles of ceramic forming materials comprising particles of aggregate and particles of bonding material, the latter slightly in excess of the amount required to fill the voids between the aggregate particles; the diametral ratios between groups of particles adjacent in the ascending scale of gradation of sizes of particles being between 1 is to 1.1 and 1 is to 8, the quantity of particles of each size being not less than equal to and not more than one and one-half times the amount of the next smaller size particles present and the gradation in size of particles including both the aggregate and the bonding material.

WILLIAM HARRY VAUGHAN.